Sept. 13, 1960  H. B. WORTMAN ET AL  2,952,799
OUTDOOR METAL-CLAD SWITCHGEAR

Filed Aug. 19, 1957  8 Sheets-Sheet 1

INVENTORS
Herman B. Wortman
& Job T. Thompson
BY
ATTORNEY

United States Patent Office 2,952,799
Patented Sept. 13, 1960

2,952,799
OUTDOOR METAL-CLAD SWITCHGEAR

Herman Barr Wortman, Wilkinsburg, and Job T. Thompson, Pittsburgh, Pa., assignors to Westinghouse Electric Corporation, East Pittsburgh, Pa., a corporation of Pennsylvania Filed Aug. 19, 1957, Ser. No. 679,039

10 Claims. (Cl. 317—103)

This invention relates, generally, to metal-clad switchgear and, more particularly, to metal-clad switchgear suitable for outdoor service.

Heretofore, outdoor metal-clad switchgear units have, in general, been of the type described in Patent No. 2,615,775, issued October 28, 1952 to G. L. Claybourn et al. A basic metal-clad switchgear unit was so constructed that it could be installed individually or with any desired number of units joined together in side-by-side relation. These units were completely factory built and assembled.

However, the metal housing for each unit was only large enough to enclose the apparatus within the housing. Thus, the maintenance personnel were exposed to the weather while servicing the apparatus. Also, any piece of apparatus, such as a circuit breaker, was exposed to the weather when it was taken out of service for inspection or maintenance. Furthermore, a relatively large drawout pad or floor was required for the circuit breaker to roll on when being installed in or removed from the housing.

An object of this invention is to provide metal-clad switchgear having an enclosed aisle for operation and maintenance of the switchgear apparatus.

A further object of the invention is to provide a completely factory built and partly factory assembled metal-clad switchgear unit which can readily be installed in service.

Another object of the invention is to provide a metal-clad switchgear unit having a panel member which is mounted in one position to protect apparatus during shipping and is moved to another position to constitute part of the aisle enclosure when the unit is installed.

A still further object of the invention is to provide a metal-clad switchgear unit in which part of the enclosure constitutes part of the supporting structure.

Still another object of the invention is to provide metal-clad switchgear units which may be disposed in two rows for a double bus arrangement with an enclosed aisle between the two rows of units.

A further object of the invention is to provide a metal-clad switchgear unit having an expansion chamber within the unit.

Other objects of the invention will be explained fully hereinafter or will be apparent to those skilled in the art.

In accordance with one embodiment of the invention, a basic switchgear unit having a circuit breaker cell, an auxiliary compartment and a spacer compartment is shipped completely assembled. An integrated front panel assembly is temporarily attached to the front of the shipping group. When the structure is erected the front panel assembly is removed from the basic unit, and end panels having preassembled doors therein are attached to the basic unit and the front panel. Metal roof sheets are supported by the front panel and the basic unit. Metal floor sheets are supported by a channel member attached to the bottom of the front panel, another channel member disposed between the front panel and the basic unit, and a channel member which is part of the base for the basic unit, thereby completing the service aisle enclosure.

For a better understanding of the nature and objects of the invention, reference may be had to the following detailed description, taken in conjunction with the accompanying drawings, in which:

Figure 1 is a view, in perspective, of an outdoor metal-clad switchgear structure embodying the principal features of the invention;

Figs. 2 to 8, inclusive, are views, in perspective, showing the manner of shipping and erecting the switchgear structure;

Figure 1:
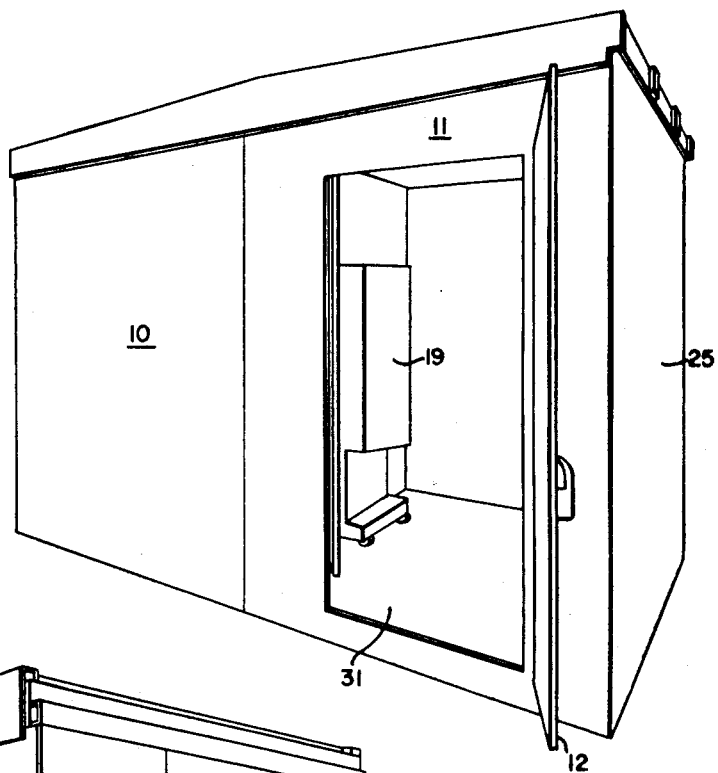
Figure 12:
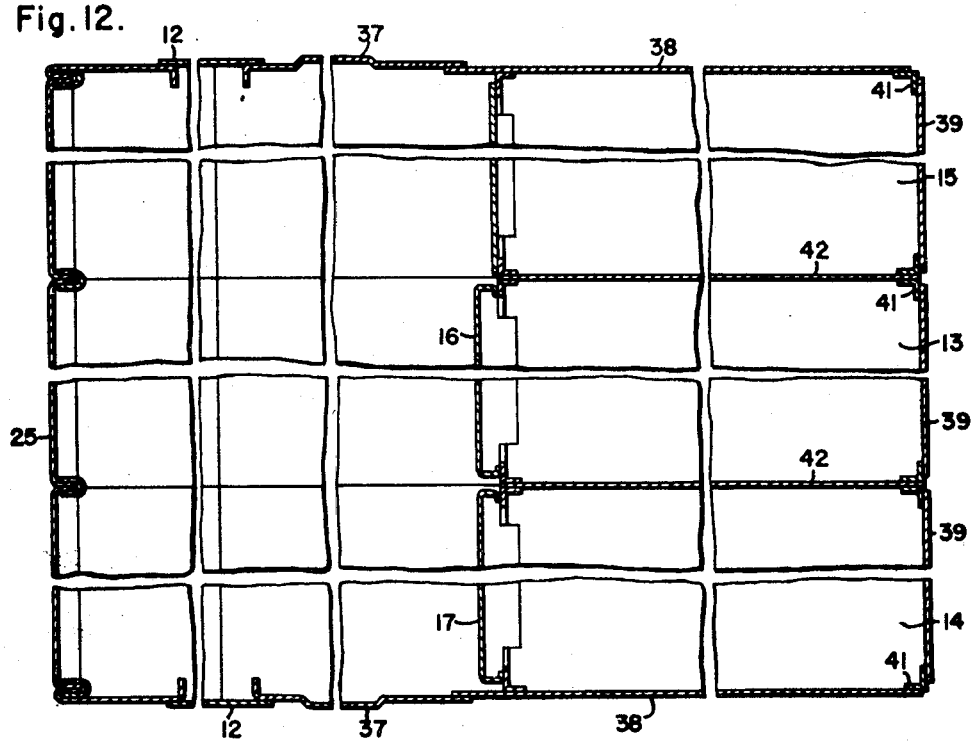
Fig. 12 is an enlarged view, in horizontal section, of the completely assembled structure.

Referring to the drawings, and particularly to Fig. 1, the switchgear structure shown therein comprises a basic unit 10 and an enclosed service aisle 11 having a door 12 at each end thereof. As shown more clearly in Figs. 9 and 12, the basic unit 10 comprises a circuit breaker cell 13 which is located between an auxiliary compartment 14 and a spacer compartment 15. The circuit breaker cell 13 has a door 16 which is hinged at the side adjacent to the spacer compartment 15. The auxiliary compartment 14 has a door 17 which is hinged at the side adjacent to the circuit breaker cell.

Figure 9:
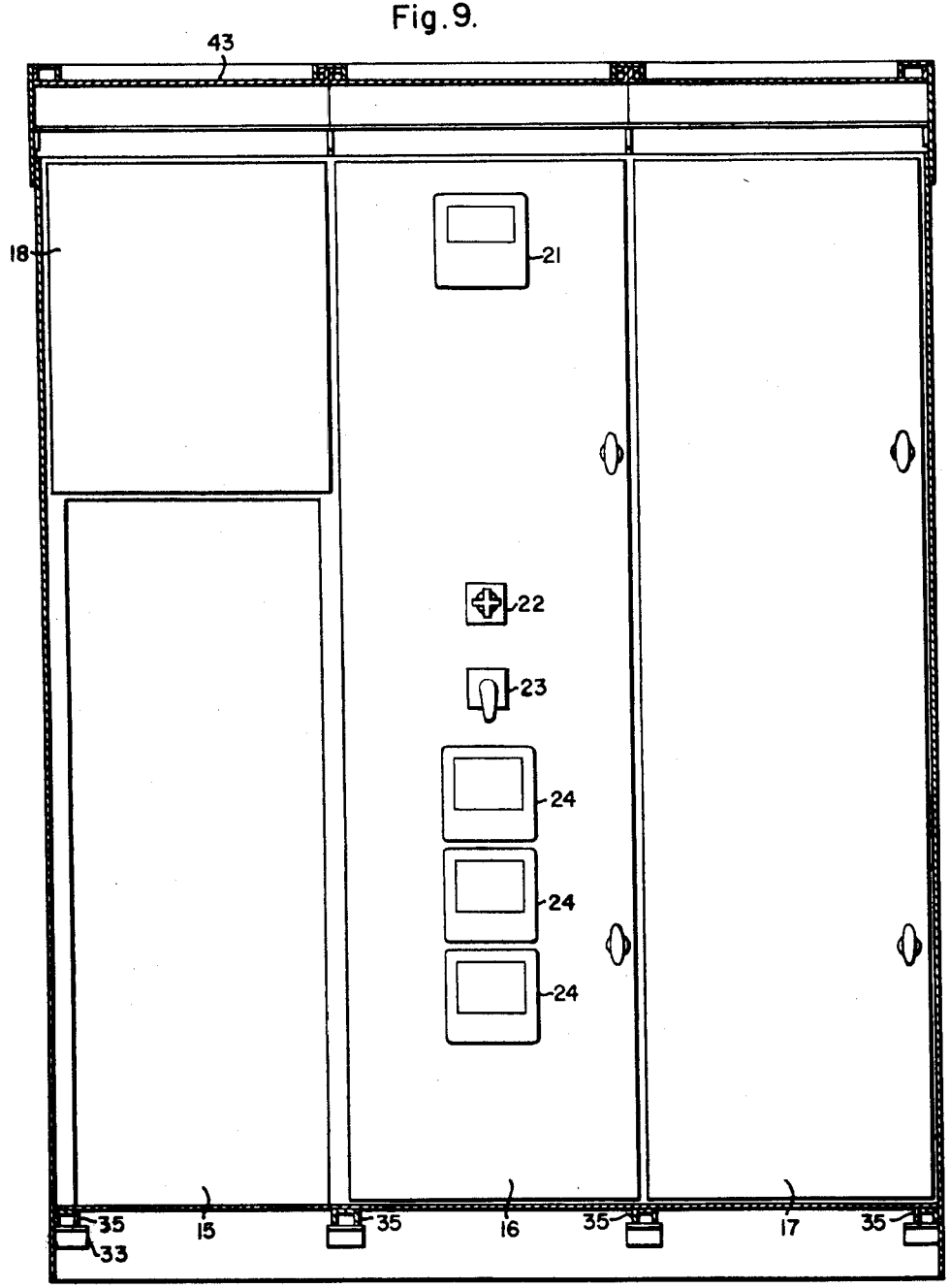
Figs. 9 and 10 are enlarged views, in section, showing the interior arrangement of the basic unit of the switchgear structure.
Figure 10:
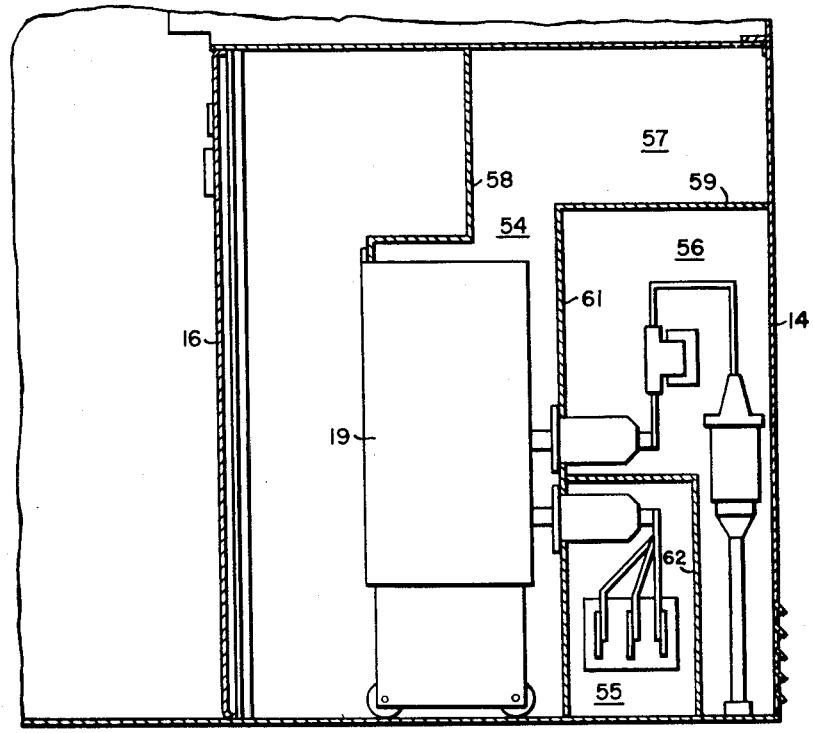

As shown more clearly in Fig. 9, the lower portion of the spacer compartment 15 is left open and the upper portion is closed by a sheet metal panel 18. As shown in Figs. 1 and 10, a circuit breaker 19, which is of the horizontal drawout type, may be disposed in the circuit breaker cell 13. As shown in Fig. 9, electrical apparatus such as, for example, an ammeter 21, an ammeter switch 22, a control switch 23 and three relays 24 may be mounted on the door 16 for the circuit breaker cell. Potential transformers of the drawout type may be mounted in the auxiliary compartment 14.

The spacer compartment 15 may be utilized for storing a spare circuit breaker unit similar to the breaker 19 since the spacer compartment is the same width as the circuit breaker cell. Storage batteries for supplying control power may be disposed in the spacer compartment if desired. If it is not desired to utilize the lower portion of the spacer compartment for a spare circuit breaker, it may be utilized for storing other apparatus or service tools. Also, the spacer compartment may be utilized as an auxiliary compartment for housing potential transformers.

The spacer compartment is of sufficient width to permit the door 16 for the circuit breaker cell next to it to swing through an angle of more than 90 degrees, thereby permitting the circuit breaker unit to be withdrawn from and installed in the circuit breaker cell. Where a plurality of circuit breaker cells are next to each other, the door 16 of one cell may swing open partly in front of the next circuit breaker cell, and only one spacer section is needed at the one end of the row of circuit breaker cells at the hinge side of the last circuit breaker cell. Likewise, the door 17 may be swung through an angle of more than 90 degrees to permit the potential transformers to be withdrawn from the auxiliary compartment 14.

As shown in Fig. 1, the aisle space is sufficiently large to permit the free interchange of circuit breaker units. Thus, one unit may be taken out of service and a spare unit installed in its place without either one of the units being exposed to the weather. To permit this, the aisle space 11 is made wide enough between the face of the basic unit 10 and the opposite wall 25 to permit two circuit breakers 19 to pass each other in the aisle 11. The aisle is also wide enough to permit the circuit breakers to be moved past the doors or hinged panels 16 at the front of the basic unit when swung out in the open position. Also, there is ample space for operation and maintenance of the apparatus without interference from the weather. The floor of the service aisle is composed of steel plates, as will be described more fully hereinafter, thereby permitting the breaker units to roll freely on the floor without requiring a special transport truck.

Figure 2:
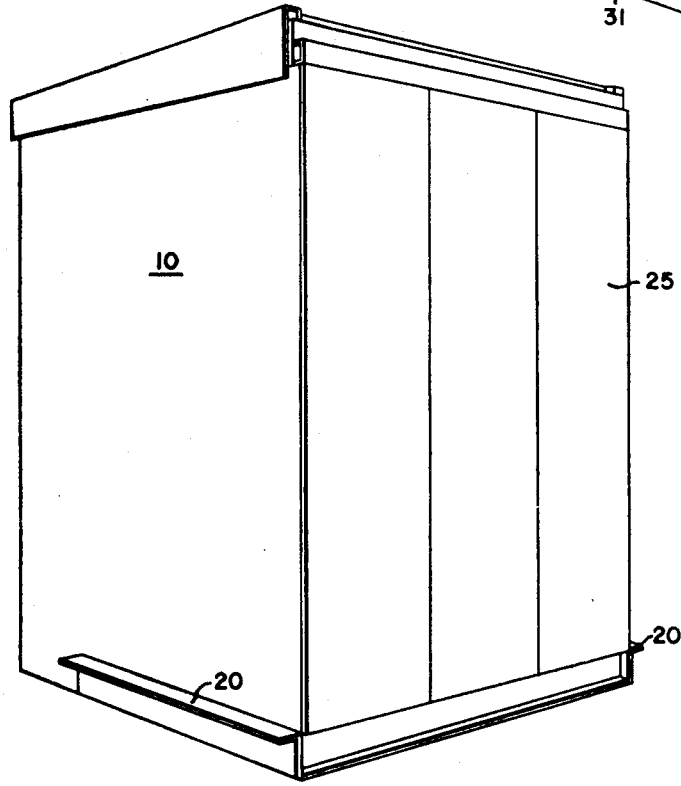

As shown in Fig. 2, the basic unit 10 is manufactured and completely assembled at the factory. An outdoor enclosure front panel assembly 25 is attached to the basic unit to protect the instruments on the door 16 of the circuit breaker cell during shipment. Lifting angles 20 are removably attached to the basic unit to facilitate handling of the basic unit during shipment.

Figure 3:
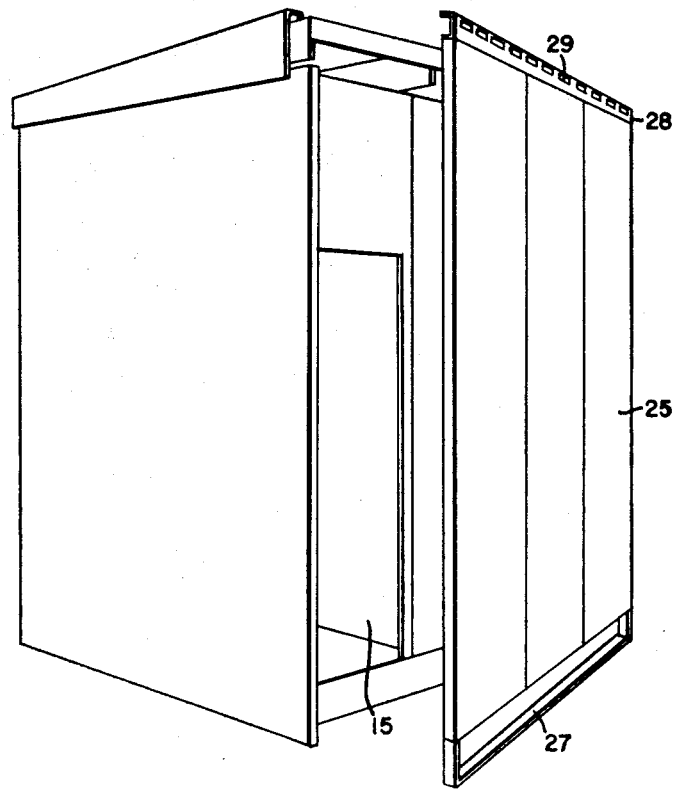
Figure 4:
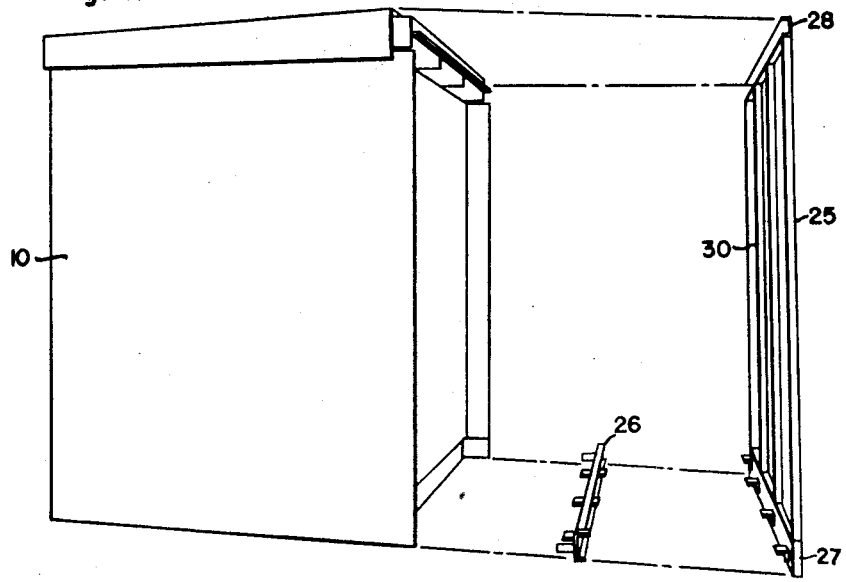

Upon arrival of the basic unit at the place of installation, the first step in the assembling of the outdoor enclosure is the unbolting of the front panel 25, as shown in Fig. 3, and the spacing of the panel 25 at a distance from the basic unit corresponding to the depth of the service aisle as shown in Fig. 4. A floor beam 26, which is generally of a channel shape, is located midway between the basic unit and the front panel 25. It will be noted that a floor beam 27 is bolted to, and forms a part of, the front panel assembly. A channel-shaped member 28, having ventilating openings 29 therein (Fig. 3), is bolted to the top of the front panel 25. As shown more clearly in Figs. 4 and 5, the vertically disposed sheets of the front panel 25 have inturned flanges 30 through which bolts may be inserted to hold the individual sheets together, thereby making an integrated panel assembly.

Figure 5:
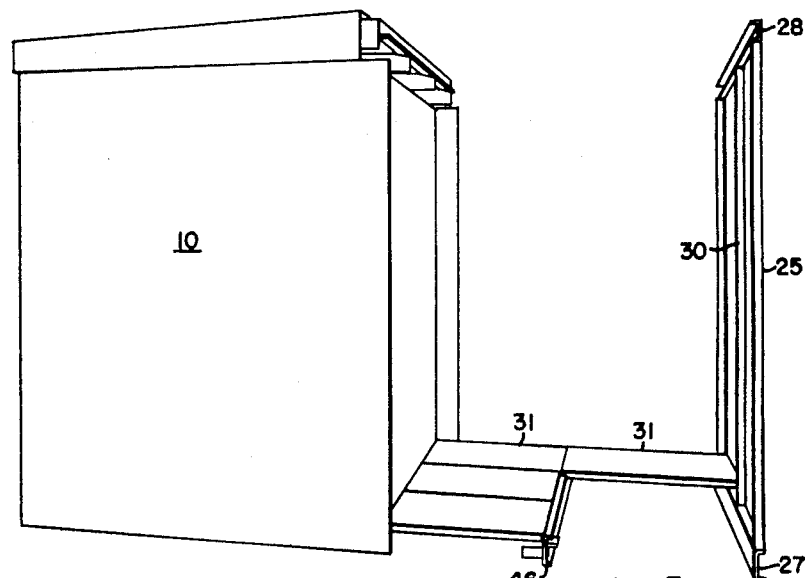
Figure 11:
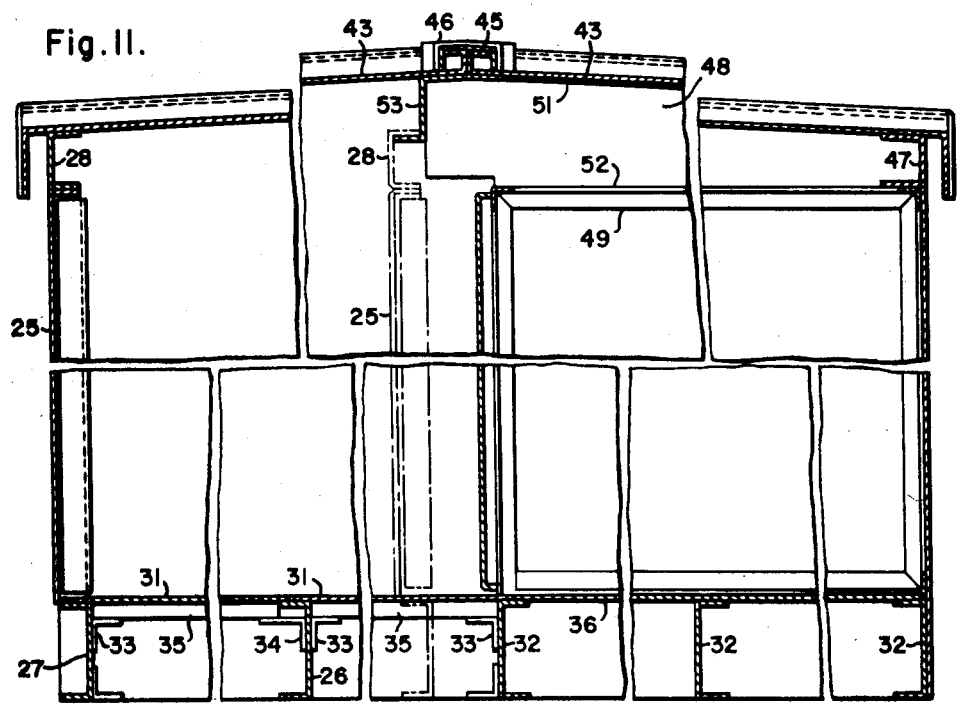
Fig. 11 is an enlarged view, in vertical section, of the completely assembled structure.

With the floor channel 26 in position and the front panel 25 retained at its proper location by suitable means, for instance braces (not shown), the next step in the assembly is laying the floor. As shown in Figs. 5 and 11, the floor consists of steel plates 31 which are supported by the channel member 27, the floor channel 26 and a base channel 32 of the basic unit 10. As shown more clearly in Figs. 9 and 11, angle members 33 and 34 are attached to the floor channel members to provide supports for channel members 35 which are attached to the floor plates 31. Additional floor plates 36 are supported by the floor channels 32, thereby providing a steel floor for the basic unit. Thus, the floor of the entire structure is constructed of steel plates and steel channel members which rest upon suitable foundation supports, thereby assuring sufficient strength to support the heaviest breaker and manpower loading. The floor plates 31 are at the same level as the surfaces in the basic unit on which the circuit breaker 19 rolls, so that the breaker rolls out directly on the floor plates and no transport truck is needed as has been required in the past in outdoor metal-clad switchgear installations.

Figure 6:
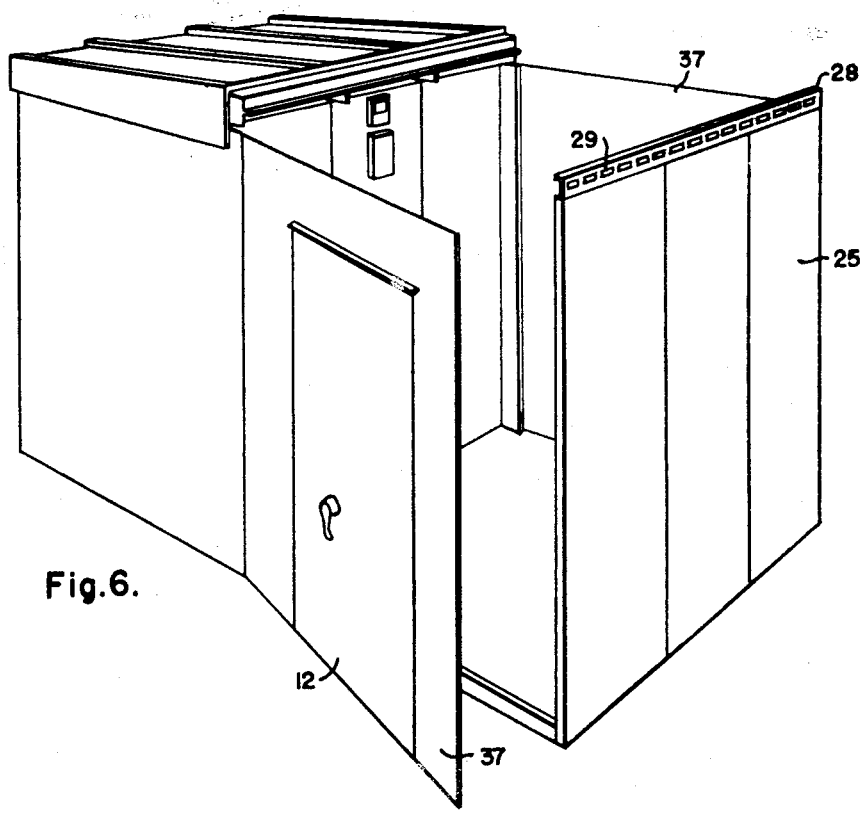

After the floor is in position, end panels 37 are then bolted to the ends of the assembly, as shown in Fig. 6. Each end panel including the door 12 is completely pre-assembled at the factory, thereby limiting field installation assembly to a minimum. As shown more clearly in Fig. 12, each end panel 37 overlaps a side sheet 38 of the basic unit. Suitable gaskets may be provided at the overlap of the joints to make them water-tight. The rear of the basic unit is enclosed by metal sheets 39 which are attached to vertical angle members 41. Sheet metal partitions 42 are provided between the breaker cell and the auxiliary compartment and between the breaker cell and the spacer compartment.

Figure 7:
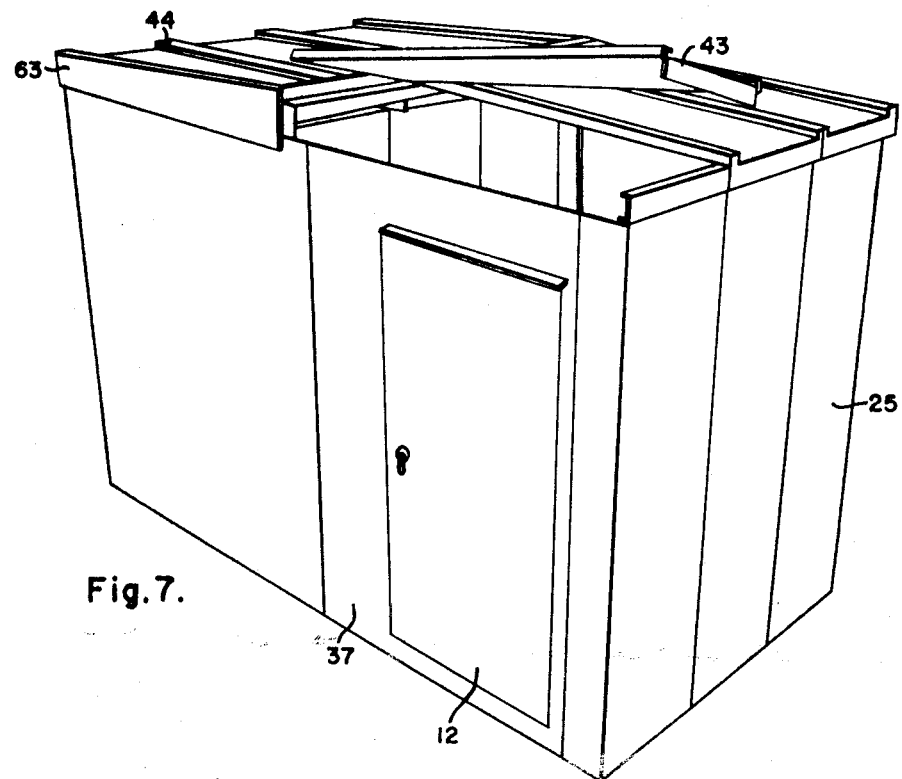
Figure 8:
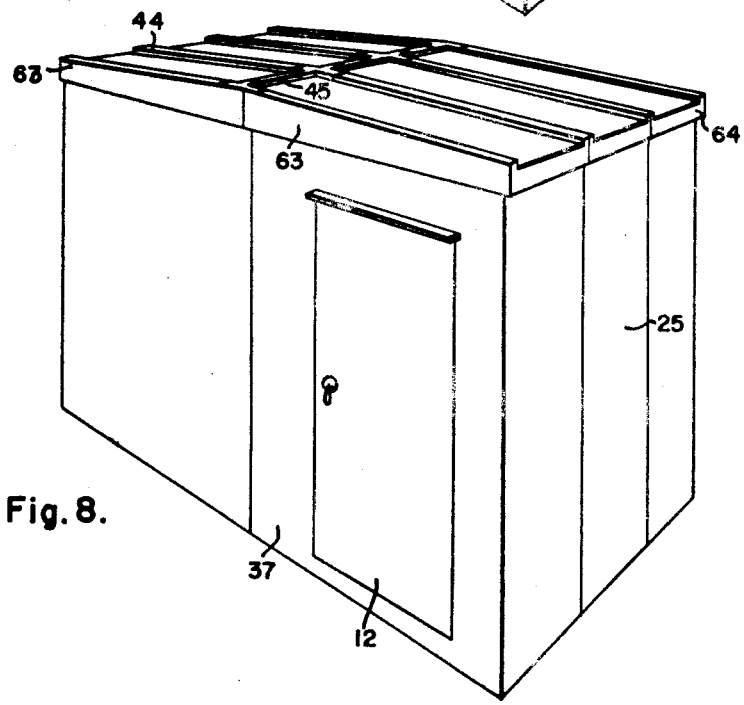

As shown in Figs. 7 and 8, the roof of the enclosure comprises metal sheets 43 of unit width which are bolted to the top of the assembly. Each roof sheet has an upstanding edge at each side of the sheet. Channel-shaped members 44 are bolted over the seams between the roof sheets, thereby making the roof weather-proof. Another channel-shaped member 45 is bolted over the seam between the abutting ends of the roof sheets for the basic unit and the service aisle. An additional cover member 46 (Fig. 11) is provided for covering the joint between the channel member 45 and the ends of the channel members 44 which abut against the channel member 45.

As shown in Fig. 11, the roof sheets are supported by the channel member 28 at the top of the front panel 25, a similar channel member 47 at the top rear of the basic unit, and horizontally disposed supports 48 which rest upon angle members 49 of the basic unit. As shown in Fig. 11, the top of each member 48 is higher at the front of the basic unit than it is at the rear of the basic unit, thereby giving the desired pitch or slope to the roof.

Each member 48 has a flange 51 at the top and a similar flange 52 at the bottom. The flange 52 rests upon the frame members 49 of the basic unit and the roof sheets rest upon the flange 51. A generally Z-shaped member 53 extends horizontally between the front ends of the roof supports 48. The members 53 support the abutting ends of the roof sheets 43 for the basic unit and the service aisle. As shown in Fig. 11, the lower horizontal legs of the Z-shaped members 53 are overlapped by the channel member 28 of the front panel 25 when the panel 25 is in the shipping position, thereby providing a reasonably tight joint between these two members to protect the apparatus on the door of the circuit breaker cell from the elements during shipment.

The auxiliary compartment 14, the circuit breaker cell 13 and the spacer compartment 15, are built as separate sections and then assembled in side-by-side relation. The sections may be tied together by means of bolts extending through the angle frame members of the structures. Thus, any desired number of sections may be assembled in side-by-side relation. In the present structure, three sections, namely the circuit breaker cell, the spacer compartment, and the auxiliary compartment, are provided.

As shown more clearly in Fig. 10, the circuit breaker cell is divided into a plurality of compartments such as a circuit breaker compartment 54, a bus compartment 55, a current transformer and outgoing cable compartment 56, and an expansion chamber 57 which is located above the cable compartment 56 and has an opening into the breaker compartment 54. Thus, the exhaust gases from the circuit breaker enter the expansion chamber during the interruption of a circuit by the circuit breaker. The various compartments are separated by partition members 58, 59, 61 and 62, as shown. The general structure of the spacer compartment 15 and the auxiliary compartment 14 is somewhat similar to the structure of the circuit breaker cell.

As shown in Figs. 7 and 8, trim members 63 are attached at the top of the structure to complete the weather-proofing of the structure. As is also shown in Fig. 8, the roof sheets 43 have downwardly extending ends 64 which extend over the ventilating openings at the top of the front panel 25. The roof sheets are turned down in a similar manner at the rear of the structure.

Figure 13:
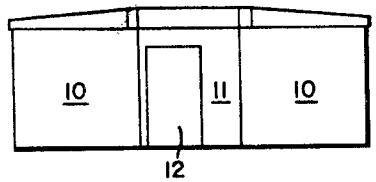
Fig. 13 is a reduced view, in end elevation of a modified switchgear structure.
Figure 14:
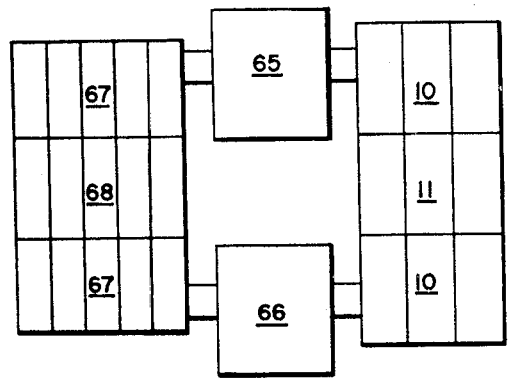
Fig. 14 is a view, in plan, of the modified structure.
Figure 15:
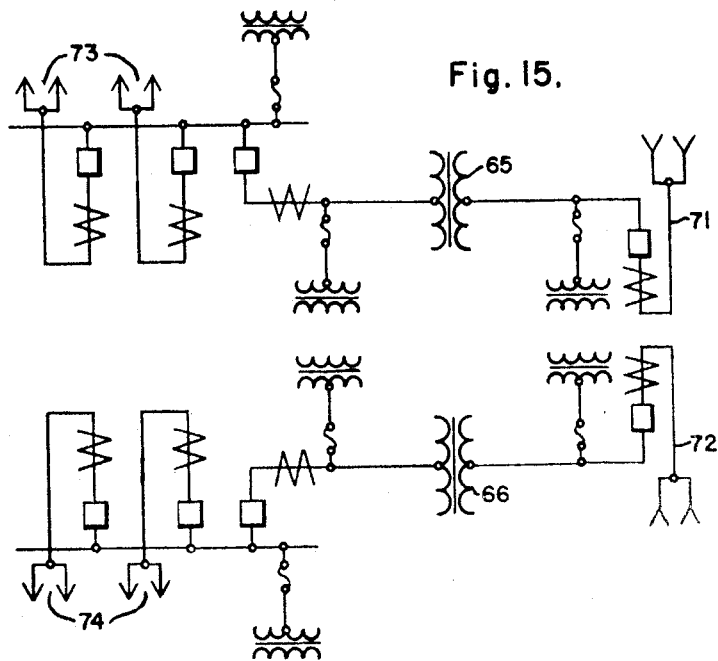
Fig. 15 is a diagrammatic view of the double-bus distribution system embodied in the structure shown in Fig. 14.

The modified structures shown in Figs. 13 and 14 are suitable for housing the apparatus required for a double-bus distribution system of the type shown in Fig. 15. In the structure shown in Fig. 13, a service aisle 11 is provided between two oppositely disposed basic units 10. Thus, the common aisle provide a weather-protected area for interchanging breakers between buses. In this case, the front panel is omitted since the basic units provide the aisle walls. The roof is entirely supported by the basic units.

As shown in Fig. 14, two oppositely disposed basic units of the type shown in Fig. 2 with a common service aisle disposed between the basic units, as shown in Fig. 13, may be provided on one side of two transformers 65 and 66. Two oppositely disposed units 67 of the same general type as the unit 10, but having slightly smaller compartments, with a service aisle 68 disposed between the units are provided on the other side of the power transformers 65 and 66. The units 10 may enclose the circuit breakers and potential transformers for incoming lines 71 and 72 for the power transformers 65 and 66, respectively. The units 67 may house the circuit breakers and potential transformers for the distribution lines 73 and 74 which are supplied with power from the low tension side of the transformers 65 and 66, respectively. Each unit 67 contains three circuit breaker cells, an auxiliary compartment for housing two potential transformers, and a spacer compartment for housing a spare circuit breaker or other apparatus as hereinbefore mentioned.

From the foregoing description, it is apparent that this invention provides an outdoor metal-clad switchgear having a sheltered aisle for operation and maintenance. The structure is completely factory built and partly factory assembled. The parts of the structure are so constructed that a minimum amount of labor is required to assemble and erect the structure at the installation location. The foundation requirements are simple as it is necessary to supply foundation supports for the floor beams only. Since the circuit breakers are supported by the steel floor when the breakers are in the operating position and also when they are being removed for maintenance, it is not necessary to provide a drawout pad as was required with previous outdoor switchgear structures.

Since numerous changes may be made in the above described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. A metal-clad switchgear structure comprising a basic unit and an enclosed service aisle, said basic unit having at least a circuit breaker cell and an auxiliary compartment disposed side-by-side, sheet metal members enclosing three sides of the basic unit, a metal roof on the basic unit, a front panel assembly for enclosing the fourth side of the basic unit during shipment, said front panel assembly being removable from the basic unit and constituting the front side of the service aisle, end panels attached to the front panel assembly and to the basic unit to enclose the service aisle, said roof sheets being attached to the front panel assembly and the basic unit after the front panel assembly is detached from the basic unit, and a metal floor for the service aisle.

2. A metal-clad switchgear structure comprising a basic unit and an enclosed service aisle, said basic unit having at least a circuit breaker cell and an auxiliary compartment disposed side-by-side, sheet metal members enclosing three sides of the basic unit, a metal roof on the basic unit, a front panel assembly for enclosing the fourth side of the basic unit during shipment, said front panel assembly being removable from the basic unit and constituting the front side of the service aisle, end panels attached to the front panel assembly and to the basic unit to enclose the service aisle, a metal door preassembled with each end panel, metal roof sheets for the service aisle, said roof sheets being attached to the front panel assembly and the basic unit after the front panel assembly is detached from the basic unit, a metal floor beam disposed between the front panel assembly and the basic unit, an additional metal floor beam attached to the front panel assembly, and metal floor sheets supported by said floor beams and the basic unit.

3. A metal-clad switchgear structure comprising a basic unit and an enclosed service aisle, said basic unit having at least a circuit breaker cell and an auxiliary compartment disposed side-by-side, sheet metal plates enclosing three sides of the basic unit, horizontally disposed flanged members at the top of the basic unit, a metal roof for the basic unit mounted on said flanged members, a front panel assembly for enclosing the fourth side of the basic unit during shipment, said front panel assembly being removable from the basic unit and constituting the front side of the service aisle, end panels attached to the front panel assembly and to the basic unit to enclose the service aisle, metal roof sheets for the service aisle, said roof sheets being supported by the front panel assembly and said horizontally disposed members, and a metal floor for the service aisle.

4. A metal-clad switchgear structure comprising a basic unit and an enclosed service aisle, said basic unit having at least a circuit breaker cell and an auxiliary compartment and a spacer compartment disposed side-by-side, hinged doors for the circuit breaker cell and the auxiliary compartment, one of said doors being hinged adjacent to the spacer compartment, said spacer compartment being at least as wide as the breaker cell, sheet metal plates enclosing three sides of the basic unit, a metal roof on the basic unit, a front panel assembly for enclosing the fourth side of the basic unit during shipment, said front panel assembly being removable from the basic unit and constituting the front side of the service aisle, end panels attached to the front panel assembly and to the basic unit to enclose the service aisle, metal roof sheets for the service aisle, said roof sheets being attached to the front panel assembly and the basic unit after the front panel assembly is detached from the basic unit, and a metal floor for the service aisle.

5. In a prefabricated metal-clad switchgear structure, in combination, two spaced basic units with a service aisle between said units, each basic unit having at least a circuit breaker cell and a spacer compartment disposed side-by-side, vertical and horizontal frame members constituting part of said cell and said compartment structure, sheet metal members enclosing three sides of each basic unit, a metal roof for each basic unit supported by said frame members, metal roof sheets for the service aisle, said roof sheets being supported by the roofs on the basic units, end panels attached to the basic units to enclose the service aisle, a metal door preassembled with each end panel, metal floor sheets in the basic units, a floor beam disposed between said basic units, and additional metal floor sheets supported by said floor beam and said basic units to be on a level with the floor sheets in the basic units.

6. In a prefabricated metal-clad switchgear structure, in combination, two spaced basic units with a service aisle between said units, each basic unit having at least a circuit breaker cell and an auxiliary compartment and a spacer compartment disposed side-by-side, vertical and horizontal frame members constituting part of said cell and said compartment structure, hinged doors for the circuit breaker cells and the auxiliary compartments, one of said doors in each basic unit being hinged adjacent to the spacer compartment in said unit to permit said door to open more than ninety degrees, sheet metal members enclosing three sides of each basic unit, a metal roof for each basic unit supported by said frame members, metal roof sheets for the service aisle, said roof sheets being supported by the roofs on the basic units, end panels attached to the basic units to enclose the service aisle, and a metal floor for the service aisle.

7. A unitary metal-clad switchgear structure comprising a basic unit and a service area and an enclosed service aisle constituting part of the unitary structure, said service aisle connecting the basic unit with the service area, said basic unit having at least a circuit breaker cell and an auxiliary compartment disposed side-by-side, a circuit breaker unit removably disposed in the cell, hinged doors for said cell and said compartment, sheet metal members attached to the basic unit to enclose three sides of the basic unit, a front panel spaced from the front of the basic unit to constitute the front side of the service aisle, end panels attached to the front panel at the ends of the aisle to enclose the service aisle, a metal door in at least one of said end panels, and the width of said service aisle between the front panel and the front of the basic unit being sufficient to permit two circuit breaker units to pass each other side-by-side when they are being moved between the circuit breaker cell and the service area.

8. A unitary metal-clad switchgear structure comprising a basic unit and a service area and an enclosed service aisle constituting part of the unitary structure, said service aisle connecting the basic unit with the service area, said basic unit having at least a circuit breaker cell and an auxiliary compartment disposed side-by-side, a circuit breaker unit removably disposed in the cell, hinged doors for said cell and said compartment, sheet metal members attached to the basic unit to enclose three sides of the basic unit, a front panel spaced from the front of the basic unit to constitute the front side of the service aisle, end panels attached to the front panel at the ends of the aisle to enclose the service aisle, a metal door in at least one of said end panels, and said front panel being spaced from the front of the basic unit a sufficient distance to permit two circuit breaker units to pass each other side-by-side with the door for the breaker cell swung open 90 degrees during an interchange of breaker units between the cell and the service area.

9. A unitary outdoor weather-proof metal-clad switchgear structure comprising a basic unit and an enclosed service area and an enclosed service aisle constituting part of the unitary structure, said service aisle interconnecting the basic unit and the service area, sheet metal plates enclosing the sides and the rear of the basic unit, a front panel spaced from the front of the basic unit to constitute the front side of the service aisle, end panels attached to the front panel at the ends of the aisle to enclose the service aisle, a door in at least one of said end panels, a circuit breaker unit removably disposed in the basic unit, floor plates in the basic unit for supporting the circuit breaker unit, and additional floor plates in the service aisle level with the floor plates in the basic unit, and said circuit breaker unit being movable on said floor plates in the service aisle.

10. A unitary outdoor weather-proof metal-clad switchgear structure comprising a basic unit and an enclosed service area and an enclosed service aisle constituting part of the unitary structure, said service aisle interconnecting the basic unit and the service area, sheet metal plates enclosing the sides and the rear of the basic unit, a front panel spaced from the front of the basic unit to constitute the front side of the service aisle, end panels attached to the front panel at the ends of the aisle to enclose the service aisle, a door in at least one of said end panels, a circuit breaker unit removably disposed in the basic unit, floor plates in the basic unit for supporting the circuit breaker unit, metal members underneath the basic unit for supporting said floor plates, additional floor plates in the service aisle level with the floor plates in the basic unit, and a metal member attached to the bottom of the front panel for supporting the floor plates in the service aisle, and said circuit breaker unit being movable on said floor plates in the service aisle.

References Cited in the file of this patent

UNITED STATES PATENTS

| | | |
|---|---|---|
| 1,920,683 | Edsall | Aug. 1, 1933 |
| 1,986,619 | Blake | Jan. 1, 1935 |
| 2,013,525 | Reed | Sept. 3, 1935 |
| 2,218,554 | Rossman | Oct. 22, 1940 |
| 2,288,650 | Rossman | July 7, 1942 |
| 2,501,345 | MacNeil | Mar. 21, 1950 |
| 2,533,645 | Volgovskoy | Dec. 12, 1950 |
| 2,633,610 | Hervey | Apr. 7, 1953 |
| 2,634,462 | Garven | Apr. 14, 1953 |
| 2,757,418 | Bergstrom | Aug. 7, 1956 |

OTHER REFERENCES

General Electric Review, pp. 16–19, November 1945.